Figure 1:
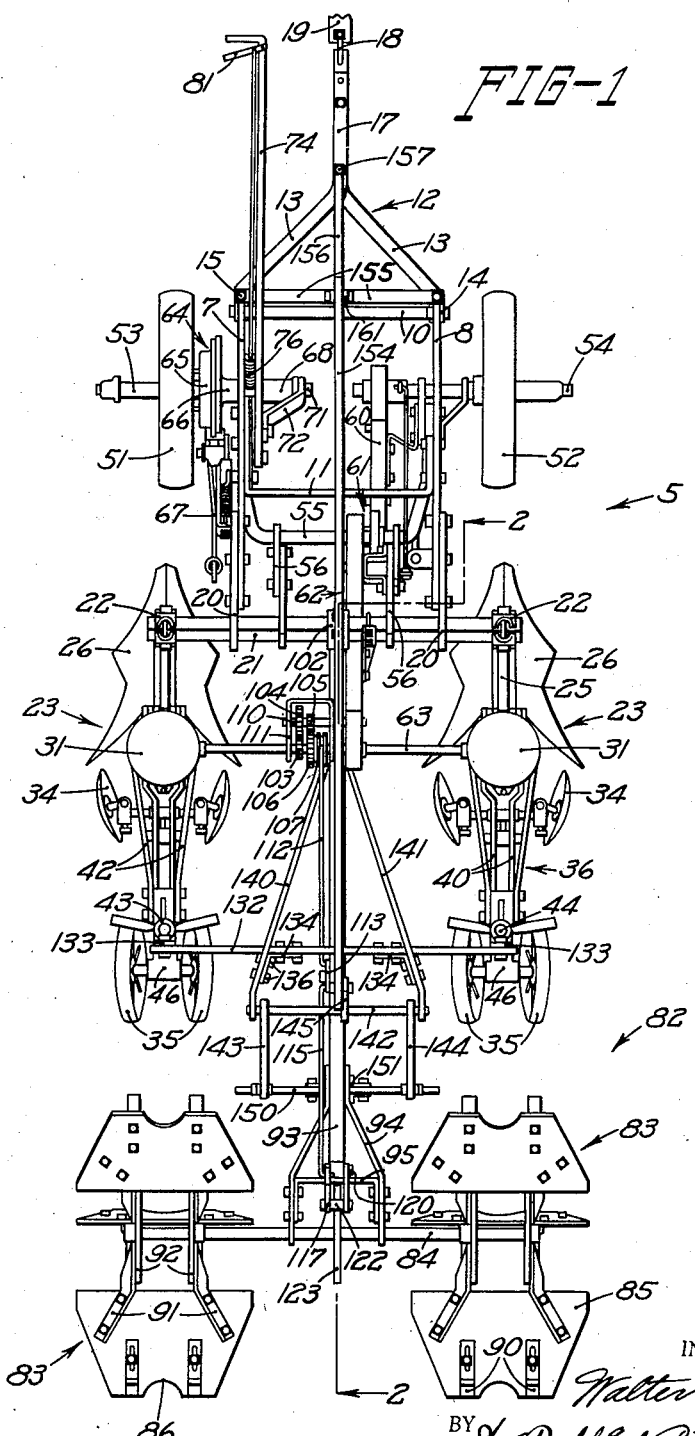

April 2, 1940.  W. H. SILVER  2,196,038
DAM FORMING DEVICE
Filed Dec. 8, 1937  2 Sheets-Sheet 1

INVENTOR.
Walter H. Silver
BY
ATTORNEYS

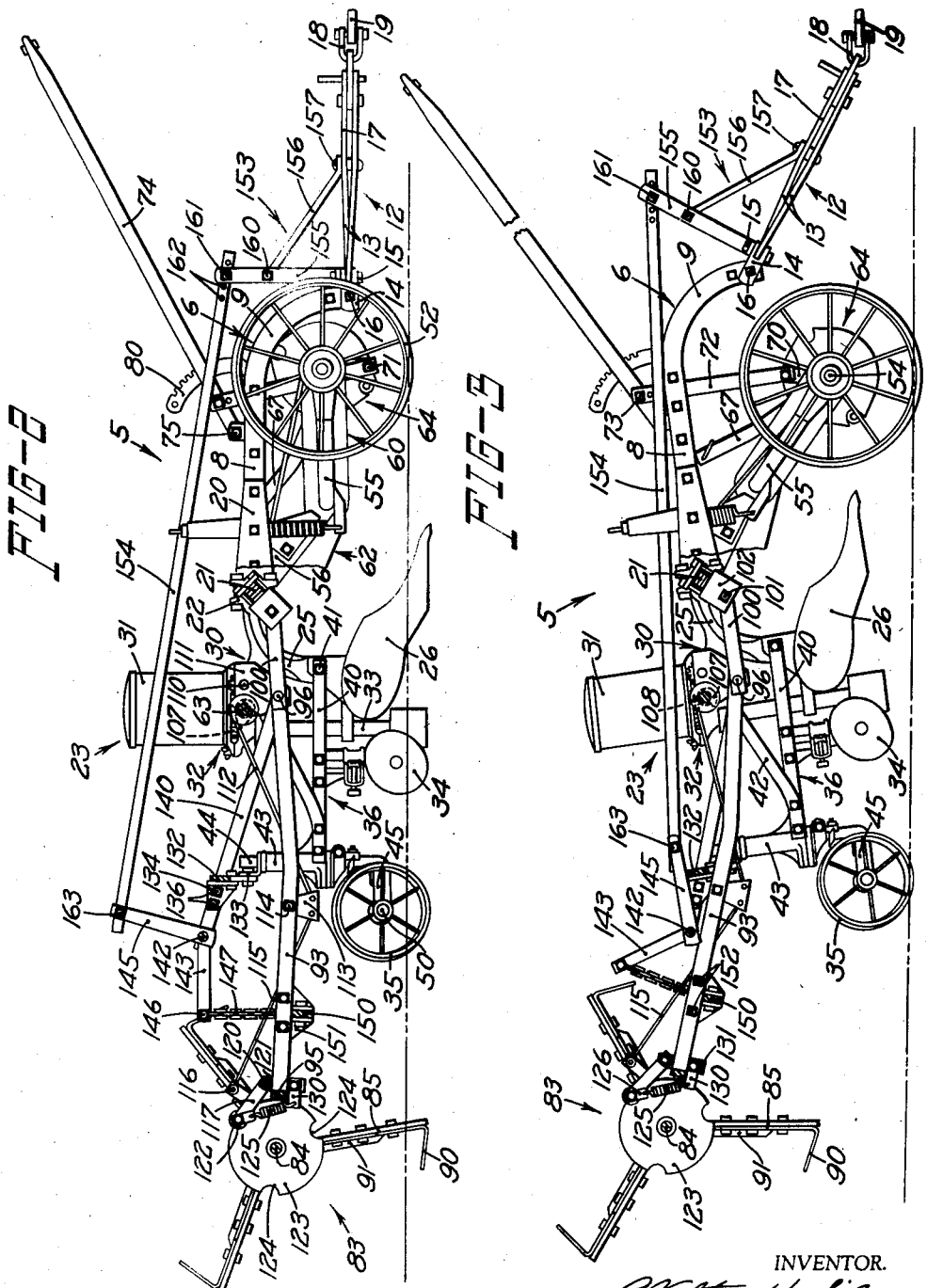

Patented Apr. 2, 1940

2,196,038

UNITED STATES PATENT OFFICE 2,196,038

DAM FORMING DEVICE

Walter H. Silver, Moline, Ill., assignor to Deere & Company, Moline, Ill., a corporation of Illinois Application December 8, 1937, Serial No. 178,745

18 Claims. (Cl. 97—55)

The present invention relates to dam forming attachments for use with listers or like implements, and more particularly to lifting mechanism for raising and lowering the dam forming attachment between operative and inoperative, or transport, positions.

The principal object of the present invention is to provide a damming device for attachment to a lister of the type comprising a frame supported at the front and rear ends thereof on wheels, the forward wheels being connected to the frame by means of crank arms which are swung downwardly by suitable power lift mechanism, tilting the frame longitudinally about the rear wheels.

Another object is the provision of lifting mechanism for a dam forming device attached to the rear of a lister, whereby angulation of two articulated frame members as the lister is raised, acts to raise the dam forming device.

These and other objects and advantages of the present invention will become apparent after a consideration of the following detailed description of a preferred embodiment. Reference is had to the appended drawings, in which Figure 1 is a plan view of a two row lister and attached dam forming device embodying the principles of the present invention;

Figure 2 is a partial sectional view taken along the line 2—2 of Figure 1, showing the implements in ground-engaging position; and Figure 3 is a view similar to Figure 2 showing the implements raised in transport position.

Referring now to the drawings, the lister, indicated in its entirety by the reference numeral 5, comprises a frame 6 including a pair of spaced longitudinal beams 7, 8, the forward ends of which are bent downwardly, as at 9, and rigidly interconnected by means of a transverse member 10. A second transverse member 11, disposed to the rear of member 10, is likewise fixed at its ends to the beams 7, 8, providing for a rigid structure to which the various tools and supporting wheels may be attached.

In the preferred embodiment shown and described herein, the lister 5 is intended for use with a tractor (not shown) to which the frame 6 is connected by means of a supplemental or draft frame 12. The draft frame 12 consists of two bail members 13 having links 14 fixed to the rear ends thereof by bolts 15. The links 14 are pivotally connected by pivot bolts 16 to the ends of the beams 7, 8 for vertical swinging movement. The bail members 13 converge forwardly and are joined to form a single draft tongue 17. A clevis 18 at the forward end of the draft tongue 17 provides means for flexibly connecting the draft frame 12 to the drawbar 19 of the tractor.

Fixed to the rear end of each of the beams 7, 8 and extending rearwardly therefrom is a bracket member 20. A transverse tool bar 21 of uniform square cross section is supported in the ends of the two bracket members 20 and rigidly fixed thereto, as by welding. Clamped to the tool bar 21 by means of clamps 22 are two laterally spaced planters 23, each comprising a downwardly and rearwardly curved tool shank 25, at the lower end of which is carried a furrow opener 26. A bracket, indicated at 30, which is preferably formed integral with the tool shank 25, supports the planting mechanism comprising a seed container 31, seed selecting and dropping mechanism 32, and seed spout 33. The spout 33 drops the seed into the bottom of the furrow directly behind the furrow opener 26 where it is immediately covered with soil by the covering shovels 34 and pressed down by the trailing press wheels 35. The covering shovels 34 and press wheels 35 are carried on a frame 36 comprising a pair of spaced longitudinal members 40 which are bolted at 41 to the tool shank 25 and are braced by struts 42. The rear end of the frame 36 includes a vertical sleeve 43 in which is journaled a spindle 44. The lower portion of the spindle 44 is bent rearwardly, as at 45, terminating in an axle housing 46, and the axles 50, upon which the furrow wheels 35 are journaled, are carried in the housing 46.

The forward portion of the lister 5 is supported on a pair of laterally spaced ground wheels 51, 52 which are fixed on live axles 53, 54, respectively. The lister frame 6 is connected to the axles 53, 54 by means of a bail 55 which is journaled for vertical swinging movement in two bracket members 56; the latter being fixed, as by welding, to the tool bar 21 and extending forwardly therefrom. The live axles 53, 54 are journaled in the ends of the bail 55.

Power for driving the seed selecting and dropping mechanisms 32 of the planters 23 is derived from the right ground wheel 52 and is transmitted by a sprocket and chain drive, indicated by the reference numeral 60, from the live axle 54 to an intermediate sprocket element, indicated at 61, which is journaled on the transverse portion of the bail 55. A second sprocket and chain drive, indicated by the reference numeral 62, transmits the power back to a seeding mechanism drive shaft 63.

Lifting of the lister 5 is accomplished by means of a self-interrupting clutch mechanism 64 of conventional design well known in the art, and adjustable connecting linkage which will be described shortly. As the details of the clutch have no bearing on the present invention, it is deemed sufficient to state that in general it comprises a continuously rotating driving element 65 which is operatively connected with the live axle 53, a normally non-rotating driven member 66 which is journaled on the axle 53, and means for optionally engaging and automatically disengaging the driving element and driven member after a half revolution. Engagement of the two members is effected by pulling on a trip lever 67 which is pivotally connected to the adjacent arm of the bail 55 and operatively connected with the engaging mechanism disposed within the clutch 64. The driven clutch member 66 includes an inwardly directed sleeve portion 68 which embraces the axle 53, and the inner end of which is provided with a crank arm 70. Connected at one end to the crank arm 70 by means of a pivot bolt 71 is a link 72, the other end of which is connected by a pivot bolt 73 to a hand lever 74. The hand lever 74 is swingably connected to the frame member 7 by means of a pivot bolt 75 and is held in position by a latch 76 which engages a notched sector 80. A grip lever 81 at the handle end of the hand lever 74 controls the latch 76.

Coming now to that portion of the implement with which the present invention is more directly concerned, a dam forming device, indicated in its entirety by the reference numeral 82, comprising two scraper blade assemblies 83 fixed on opposite ends of a transverse shaft 84, is disposed to the rear of the lister 5 with each of the blade assemblies 83 aligned with its respective planter 23 to operate in the furrow formed thereby. Each blade assembly 83 consists of three blades 85 arranged radially about the shaft 84 at 120 degrees spacing. The sides of the blades 85 are tapered to accommodate the sides of the furrow, while the center portion of the outer edge is relieved, as at 86, to clear the seed planted by the planter 23 and prevent its being disturbed. Adjustable gauging runners 90 are fixed to the back sides of the blades 85 to hold the latter at a constant predetermined working depth. Bracket members 91 connect the blades 85 to a pair of spaced plates 92 which are fixed to the shaft 84.

Connecting the dam forming device 82 to the lister 5 is a forwardly extending draft beam 93, at the rear portion of which are fixed two rearwardly diverging members 94 braced by a cross member 95. The shaft 84 is journaled in the ends of the members 94. The forward end of the draft beam 93 is pivotally connected by means of a transverse pivot bolt 96 to a link 100, providing for vertical swinging movement of the beam 93. The link 100 is secured by a bolt 101 to a bracket member 102 which is clamped to the tool bar 21.

In the operation of the dam forming device 82, the scraper blade assembly 83 is held against rotation and in operative position, illustrated in Figure 2, as it is drawn through the furrow opened up by the furrow opener 26. The operatively positioned blade 85 engages the sides of the furrow and scrapes soil from the sides thereof until sufficient has been accumulated to form a dam. At this point the blade assembly 83 is released and permitted to rotate, depositing the accumulation of soil across the furrow, while the succeeding balde 85 is swung downwardly and locked into operating position. In the embodiment shown and described herein, the dams are spaced an equal distance apart by escapement mechanism actuated by the ground wheel 52 and thereby controlled by the forward movement of the implement over the ground. It has previously been explained that the seeding mechanism shaft 63 is operatively connected to the live axle 54 by means of sprocket and chain drives 60 and 62 and therefore rotates at a speed directly proportional to the speed of rotation of the ground wheel 52. The shaft 63 is employed to actuate the escapement mechanism for the scraper blade assemblies 83, therefore, and driving connection is made through a train of speed reduction gears 103, 104, 105, and 106 to rotate a cam 107 which is journaled on the shaft 63. Gear 103 is fixed on the shaft 63; both gears 104, 105 are fixed on a countershaft 110 which is journaled in a bracket 111; and the driven gear 106 is journaled on the shaft 63 and fixedly connected to the cam 107. The bracket 111 is journaled on the shaft 63 for support and also connected to the link 100 by means of the pivot bolt 96, the latter connection holding the bracket 111 against rotation about the shaft 63. A cam follower 108 attached to one end of a rearwardly extending rod 112, engages the cam 107 and with each revolution of the latter is drawn forwardly and then released to drop back to its original position. The rear end of the rod 112 is swingably connected to a link 113 which is pivotally connected at 114 to the draft beam 93. A second rod 115 is likewise swingably connected to the link 113 and extends rearwardly to a pivotal connection at 116 with a rearwardly inclined detent arm 117. The latter is swingably connected at 120 to a stub 121 which projects upwardly from the end of the draft beam 93. Thus, it will be seen that the reciprocating movement of the rod 112 as the attached cam follower is acted upon by the cam 107 is transmitted back to the detent arm 117 to swing the latter in a vertical plane.

A roller 122 journaled in the outer end of the detent arm 117 bears against the periphery of a circular disk 123 which is fixed on the shaft 84. The disk 123 is notched at three 120 degrees spaced points 124, and when the blade assembly 83 is in operative position, one of the notches 124 is engaged by the roller 122 thus holding the disk 123, shaft 84, and scraper blade assemblies 83 against rotation. When the detent arm 117 is swung upwardly under the influence of the cam 107, the roller 122 is disengaged from the notch 124 and the scraper blade assemblies 83 are permitted to rotate. A spring 125 connected at one end by means of a link 126 to the detent arm 117, and at the other end by a link 130 to a stub 131 extending downwardly from the end of the draft beam 93, holds the roller under tension against the disk 123.

It has previously been pointed out that the lister 5 is raised to inoperative or transport position by action of the self-interrupting clutch mechanism 64 on linkage connected to the frame 6, which causes the bail 55 to be swung downwardly and thereby raises the front end of the lister 5 sufficiently high for the planter tools to clear the ground. Obviously this tilting of the frame longitudinally about the rear furrow wheels 35 will not, in itself, raise the dam forming device 82 which is disposed to the rear of the furrow wheels. Therefore, supplementary lifting linkage is required for lifting the dam forming device at the same time that the lister is raised, and to this end a transverse beam 132 has been provided, upon which is carried lifting mechanism now to be described. The beam 132 is bowed upwardly in the center portion thereof to provide clearance for the draft beam 93 as the latter is swung upwardly, and to the ends of the transverse beam 132 are bolted angle brackets 133 which are fixed to the tops of the vertical sleeves 43. A pair of brackets 134 is spaced symmetrically on either side of the center of the beam 132 and fixed thereto. Secured to the brackets 134 by bolts 136 and extending diagonally forwardly and downwardly therefrom, are two bracing members 140, 141 which converge on opposite sides of the link member 100 and are fixed thereto by the pivot bolt 96. A transverse rock shaft 142 is journaled in the ends of the bracing members 140, 141, which extend a short distance rearwardly of the brackets 134, and fixed to the rock shaft 142 adjacent the members 140, 141 are two rearwardly extending lifting arms 143, 144. Also fixed to the shaft 142 midway between the lifting arms 143, 144 is an upwardly extending crank arm 145, the purpose of which shall be explained later.

Fastened to the outer end of each of the lifting arms 143, 144 by a bolt 146 is a chain 147 which is connected at its lower end to a transverse bar 150. The latter is fixed to two brackets 151 which are bolted by bolts 152 to the draft beam 93. Thus, rocking the lifting arms 143, 144 raises or lowers the draft beam 93 and attached dam forming device 82.

In the preferred embodiment shown and described herein the rock shaft 142 is rocked by linkage connecting the draft frame 12 with the crank arm 145. When the lister 5 is raised by tilting the frame 6, the front ends of the beams 7, 8 are raised relative to the point of connection of the draft frame 12 to the tractor drawbar 19, causing the draft frame 12 to swing relatively downwardly about the pivot bolt 16. The resulting angulation between the lister frame 6 and draft frame 12 is translated into reciprocating motion by means of a crank structure, indicated in its entirety by the reference numeral 153, and is transmitted by a connecting rod 154 to the crank arm 145 to rock the rock shaft 142. The crank structure 153 comprises a pair of members 155 which are connected by the bolts 15 to the draft frame 12 adjacent the links 14, and extend upwardly in converging relation to join on opposite sides of a bracing strut 156. The three members are joined by a bolt 160 at this point and the two members 155 continue upwardly in parallel relation and spaced apart the thickness of the intervening bracing strut 156. The strut 156 extends downwardly and forwardly and is fixed at 157 to the draft tongue 17, providing for longitudinal rigidity of the crank structure 153. The connecting rod 154 is carried between the ends of the members 155 and is pivotally connected thereto by a pin bolt 161. Additional perforations 162 in the end of the connecting rod 154 provide means for adjusting the working depth of the dam forming device 82 by changing the angular position of the crank arm 145 relative to the crank structure 153. The connecting rod 154 is pivotally connected at its rear end to the crank arm 145 by means of a pivot bolt 163.

By this linkage arrangement, the weight of the dam forming device 83 is made to bear downwardly upon the ground wheels 51, 52 when the implement is raised, increasing the traction and thereby improving the operation of the power lift clutch 64 which derives its power from the tractive force of wheel 51.

What I claim as my invention is:

1. In combination, an implement frame, ground engaging support means carried on said frame at the rear end thereof, ground wheels disposed at the front end of said frame, means connecting said frame to said ground wheels for vertical movement relative thereto, traction operated power lift means for raising the front end of said frame on said ground wheels and tilting the frame upwardly about said support means as a fulcrum, a supplemental frame member pivotally connected to said implement frame near the front end thereof and adapted to be swung relatively downward as the frame is tilted, a tool holding member connected to said implement frame adjacent the rear end thereof for relative vertical movement, and lifting means actuated by swinging movement of said supplemental frame member for raising said tool holding member.

2. In combination, an implement frame, ground engaging support means carried on said frame at the rear end thereof, ground wheels disposed at the front end of said frame, means connecting said frame to said ground wheels for vertical movement relative thereto, traction operated power lift means for raising the front end of said frame on said ground wheels and tilting the frame upwardly about said support means as a fulcrum, a supplemental frame member connected to said implement frame for vertical swinging, said supplemental frame member being swung relatively downward as the frame is tilted, a tool holding member connected to said implement frame for relative vertical swinging, and means responsive to the downward swinging movement of said supplemental frame member for swinging said tool holding member upwardly.

3. In combination, an implement frame, supporting wheel means journaled on said frame at the rear end thereof, ground wheels disposed at the front end of said frame, means connecting said frame to said ground wheels for vertical movement relative thereto, traction operated power lift means for raising the front end of said frame on said ground wheels and tilting the frame upwardly about said rear supporting wheel means as a fulcrum, a supplemental frame member pivotally connected to said implement frame near the front end thereof and adapted to be swung relatively downward as the frame is tilted, a tool holding member connected to said implement frame adjacent the rear end thereof for relative vertical movement, and lifting means comprising a rock shaft journaled on said implement frame, a lifting arm fixed to said rock shaft, means connecting said lifting arm with said tool holding member, and means responsive to the swinging movement of said supplemental frame member for rocking said rock shaft and thereby raising said tool holding member.

4. In combination with an implement frame having a ground engaging support member disposed near the rear end thereof and a draft member pivotally connected near the front end thereof, a ground working tool fixed to said frame ahead of said support member, a second ground working tool disposed to the rear of said support member, draft means connecting said second ground working tool to said frame for vertical swinging movement, traction operated power lift mechanism for tilting said frame upwardly about said support member as a fulcrum to raise said first named tool out of ground engaging position, said draft member being swung relatively downward by the tilting of said frame, lifting means for raising said second tool out of the ground, and means responsive to the downward swinging movement of said draft member for actuating said lifting means.

5. In combination, an implement frame, a furrow forming tool carried thereon, a rear support wheel journaled on said frame behind said tool, ground wheels disposed ahead of said tool, means for connecting said frame to said ground wheels for vertical movement relative thereto, lifting mechanism for raising the front end of said frame on said ground wheels and tilting said frame longitudinally about said rear support wheel as a fulcrum, a draft member pivotally connected near the front end of said frame and adapted to be swung relatively downward as the frame is tilted, a ground working tool disposed behind said rear support wheel, draft means connecting said ground working tool to said frame for vertical movement relative thereto, and lifting means actuated by swinging movement of said first named draft member for raising said ground working tool.

6. In combination, an implement frame and a furrow forming tool carried thereon, a rear furrow wheel journaled on said frame behind said tool, crank arms journaled on said frame ahead of said tool for vertical swinging movement, supporting wheels journaled in the ends of said crank arms, power lift mechanism for swinging said cranks downwardly to raise the front end of said frame about said rear furrow wheel as a pivot, a draft member pivotally connected near the front end of said frame and adapted to be swung downwardly relative to the front end of said frame as the latter is lifted, a damming device disposed behind said rear furrow wheel and adapted to operate in the furrow formed by said tool, a draft frame connecting said damming device to said frame for vertical swinging movement, and lifting means actuated by swinging movement of said first named draft member for raising said damming device.

7. In a tractor drawn implement the combination of a frame and a furrow forming tool carried thereon, a rear furrow wheel journaled on said frame behind said tool, crank arms journaled on said frame ahead of said tool for vertical swinging movement, supporting wheels journaled in the ends of said crank arms, power lift mechanism for swinging said cranks downwardly to raise the front end of said frame about said rear furrow wheel as a pivot, a draft member pivotally connected near the front end of said frame and adapted to be swung downwardly relative to the front end of said frame as the latter is lifted, a lever arm fixed to said draft member, means for connecting said draft member to the tractor, a damming device disposed behind said rear furrow wheel and adapted to operate in the furrow formed by said tool, a draft frame connecting said damming device to said frame for vertical swinging movement, and lifting means comprising a rock shaft journaled on said frame, lifting arms fixed to said rock shaft, link means connecting said lifting arms to said damming device, a lever arm fixed to said rock shaft, and link means connecting said last named lever arm with said first named lever arm whereby swinging movement of said first named draft member acts to rock said rock shaft.

8. In combination, an implement comprising a generally longitudinal frame supported at the front and rear ends thereof on ground wheels, a ground working tool carried on said frame, an auxiliary tool holding member swingably connected to said frame for vertical movement, a draft member pivotally connected for vertical swinging to the front end of said frame, means for swingably connecting said draft member to a tractor drawbar, the latter being held against appreciable vertical movement, means for raising the front end of said frame on said ground wheels and swinging said draft member upwardly therewith, and link means connecting said draft member with said auxiliary tool holding member whereby the latter is raised by the aforesaid swinging movement of said draft member.

9. In combination, an implement comprising a generally longitudinal frame supported at the front and rear ends thereof on ground wheels, a ground working tool carried on said frame, an auxiliary tool holding member swingably connected to said frame for vertical movement and adapted to operate to the rear of the frame, lifting means carried on said frame and operatively connected with the auxiliary tool holding member to raise the latter, a draft member pivotally connected for vertical swinging to the front end of said frame, means for swingably connecting said draft member to a tractor drawbar, the latter being held against appreciable vertical movement, means for raising the front end of said frame on said ground wheels and swinging said draft member upwardly therewith, and link means connecting said draft member with said lifting means whereby the latter is actuated by the aforesaid swinging movement of said draft member.

10. An implement comprising, in combination, a main frame, a supporting wheel journaled on said frame, ground engaging support means spaced from said supporting wheel, means connecting said frame with said supporting wheel for vertical movement relative thereto, means for raising one end of said frame relative to said supporting wheel, a supplemental frame pivotally connected to said main frame and adapted to swing vertically when the end of said main frame is raised, a tool holding member swingably connected to said main frame, and means responsive to swinging movement of said supplemental frame for swinging said tool holding member.

11. In combination, an implement frame, a supporting wheel journaled on said frame, ground engaging support means spaced longitudinally from said supporting wheel, means connecting said frame with said supporting wheel for relative vertical movement, power lift mechanism actuated by said supporting wheel for raising said frame on said supporting wheel about said support means as a fulcrum, a draft member connected to said frame for vertical swinging, said draft member being swung relatively downward when said frame is raised, a tool holding member connected to said frame for vertical swinging, and means responsive to the downward swinging of said draft member for swinging said tool holding member upwardly.

12. An implement comprising a main frame and a supplemental frame member connected together for vertical swinging movement, a supporting wheel, means connecting said main frame with said supporting wheel for vertical movement relative thereto, means for raising said frame relative to said supporting wheel, said supplemental frame member being swung vertically relative to said frame when the latter is raised, a tool holding structure connected to said main frame for vertical movement relative thereto, and means responsive to the swinging movement of said supplemental frame member for raising said tool holding member.

13. An implement comprising a main frame and a supplemental frame member connected together for vertical swinging movement, a crank axle journaled on said main frame for vertical swinging, a ground wheel journaled on the end of said crank axle, power lift mechanism for swinging said crank axle downwardly to raise the frame, said supplemental frame member being swung downwardly relative to said frame when the frame is raised, a tool holding structure connected to said main frame for vertical movement relative thereto, and means responsive to the downward swinging movement of said supplemental frame member for raising said tool holding member.

14. In combination, an implement frame, supporting wheel means journaled on said frame at the rear end thereof, a crank arm journaled on said frame adjacent the front end thereof for vertical swinging movement, a ground wheel journaled on the end of said crank arm, traction operated power lift mechanism driven from said ground wheel for swinging said crank arm downwardly to raise the front end of said frame about said rear supporting wheel means as a pivot, a supplemental frame member pivotally connected to said frame near the front end thereof and adapted to be swung relatively downward as the front end of the frame is lifted, a tool holding member connected to said frame adjacent the rear end thereof for relative vertical movement, and lifting means actuated by swinging movement of said supplemental frame member for raising said tool holding member.

15. An implement comprising in combination with a tractor, a main frame and a supplemental frame member connected together for vertical swinging movement, a supporting wheel, means connecting said main frame with said supporting wheel for vertical movement relative thereto, means for raising said frame relative to said supporting wheel, said supplemental frame member being pivotally connected at its front end to the tractor body so as to swing upwardly with said frame when the latter is raised, a tool holding structure connected to said main frame for vertical movement relative thereto, and means responsive to the angular movement between said supplemental frame member and said main frame when the latter is raised for raising said tool holding member.

16. An implement comprising a main frame and a supplemental frame member connected together for vertical swinging movement, a crank axle journaled on said main frame for vertical swinging, a ground wheel journaled on the end of said crank axle, power lift mechanism for swinging said crank axle downwardly to raise the frame, hitch means adapted to hold the free end of said supplemental frame member against vertical movement when the frame is raised and thereby causing angular movement between the supplemental frame member and main frame, a tool holding structure connected to said main frame for vertical movement relative thereto, and means responsive to the angular movement of said supplemental frame member for raising said tool holding member.

17. An implement comprising, in combination, a longitudinally disposed main frame, a draft member connected to the front end thereof for vertical swinging movement, a supporting ground wheel connected with said frame for vertical movement relative thereto, power lift mechanism actuated by said ground wheel for raising the front end of said frame, hitch means connected to said draft member to hold the front end thereof against vertical displacement, a tool holding member connected to said frame for relative vertical movement, and link means connecting said draft member with said tool holding member and responsive to angular movement between the draft member and main frame when the latter is lifted for raising the tool holding member, said link means acting to apply a portion of the weight of the tool holding member downwardly on said ground wheel to increase the traction thereof.

18. An implement comprising a generally fore and aft extending frame having longitudinally spaced ground engaging support means disposed near the front and rear ends thereof, respectively, a draft member connected with one end of said frame by means providing for free vertical movement relative thereto, an operating tool connected with the other end of the frame for relative vertical movement, means for raising the draft member end of the frame relative to its respective support member, causing said draft member to move vertically with respect to the frame, and means responsive to relative movement between the draft member and frame for raising said tool.

WALTER H. SILVER.